United States Patent
Graeber et al.

(10) Patent No.: US 11,492,963 B2
(45) Date of Patent: Nov. 8, 2022

(54) EXTENDED GAS TURBINE PROCESS HAVING AN EXPANDER

(71) Applicant: Siemens Energy Global GmbH & Co. KG, Munich (DE)

(72) Inventors: Carsten Graeber, Erlangen (DE); Uwe Juretzek, Erlangen (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 0 days.

(21) Appl. No.: 17/050,482

(22) PCT Filed: May 6, 2019

(86) PCT No.: PCT/EP2019/061483
§ 371 (c)(1),
(2) Date: Oct. 26, 2020

(87) PCT Pub. No.: WO2019/223985
PCT Pub. Date: Nov. 28, 2019

(65) Prior Publication Data
US 2021/0123377 A1    Apr. 29, 2021

(30) Foreign Application Priority Data

May 22, 2018  (DE) ..................... 10 2018 207 961.7

(51) Int. Cl.
*F02C 3/30*      (2006.01)
*F02C 1/05*      (2006.01)
(Continued)

(52) U.S. Cl.
CPC .................. *F02C 1/05* (2013.01); *F02C 3/10* (2013.01); *F02C 3/30* (2013.01); *F02C 7/10* (2013.01);
(Continued)

(58) Field of Classification Search
CPC .................................... F02C 7/08; F02C 7/10
See application file for complete search history.

(56) References Cited

U.S. PATENT DOCUMENTS

| 2,172,708 A | 9/1939 | Karrer |
| 5,313,782 A | 5/1994 | Frutschi et al. |
| (Continued) | | |

FOREIGN PATENT DOCUMENTS

| EP | 1286030 A1 | 2/2003 |
| EP | 1609958 A1 | 12/2005 |
| (Continued) | | |

OTHER PUBLICATIONS

Lechner Christian et al: "Stationäre Gasturbinen", 2. neu bearbeitete Auflage, Berlin, Heidelberg: Springer-Verlag, 2010; pp. 41, 42, 66-68, 470, 471, 980; ISBN 978-3-540-92788-4; 2010; [English machine translation of "Stationary gas turbines" attached].

(Continued)

*Primary Examiner* — Gerald L Sung
*Assistant Examiner* — Jacek Lisowski

(57) ABSTRACT

A power plant including a compressor, a combustion chamber and a turbine, and a compressor air line, which connects the compressor to the combustion chamber, a first heat exchanger connected into the compressor air line and into an exhaust line branching off the turbine. A first expander is arranged between the first heat exchanger and the combustion chamber in the compressor air line, and the first expander and the compressor are arranged on a common shaft.

4 Claims, 8 Drawing Sheets

(51) Int. Cl.
*F02C 3/10* (2006.01)
*F02C 7/143* (2006.01)
*F02C 7/224* (2006.01)
*F02C 7/10* (2006.01)

(52) U.S. Cl.
CPC ............ *F02C 7/1435* (2013.01); *F02C 7/224* (2013.01); *F05D 2220/32* (2013.01); *F05D 2260/213* (2013.01)

(56) References Cited

U.S. PATENT DOCUMENTS

| | | | |
|---|---|---|---|
| 5,347,806 A | | 9/1994 | Nakhamkin |
| 5,388,397 A | | 2/1995 | Frutschi |
| 6,276,123 B1 | | 8/2001 | Chen et al. |
| 8,176,724 B2* | | 5/2012 | Smith ................ F01K 7/16 60/39.53 |
| 9,938,895 B2* | | 4/2018 | Kerth ................ F02C 6/16 |
| 2002/0134085 A1 | | 9/2002 | Frutschi |
| 2003/0051496 A1 | | 3/2003 | Fukushima et al. |
| 2004/0011047 A1 | | 1/2004 | Reissig |
| 2005/0121532 A1* | | 6/2005 | Reale ................ F02C 7/143 237/12.1 |
| 2011/0088399 A1* | | 4/2011 | Briesch ................ F01K 23/10 60/670 |
| 2011/0265477 A1 | | 11/2011 | Drouvot et al. |
| 2011/0289953 A1 | | 12/2011 | Alston |
| 2012/0317988 A1* | | 12/2012 | Gardiner ................ F02C 7/224 60/772 |
| 2013/0001948 A1* | | 1/2013 | Lim ................ F02C 7/08 290/52 |
| 2014/0102071 A1* | | 4/2014 | Ball, Jr. ................ F02C 7/224 60/39.52 |
| 2014/0298813 A1* | | 10/2014 | Brunhuber ............ F01K 3/006 60/645 |
| 2015/0369125 A1 | | 12/2015 | Reiter et al. |
| 2017/0114672 A1* | | 4/2017 | Watkins ................ B01D 3/065 |
| 2018/0045080 A1 | | 2/2018 | Uechi et al. |

FOREIGN PATENT DOCUMENTS

| | | |
|---|---|---|
| GB | 2357552 A | 6/2001 |
| JP | S45012641 Y | 6/1970 |
| JP | S6017232 A | 1/1985 |
| JP | S60008432 U | 1/1985 |
| JP | S61265328 A | 11/1986 |
| JP | H0354327 A | 3/1991 |
| JP | H05179904 A | 7/1993 |
| JP | H06212910 A | 8/1994 |
| JP | H06294328 A | 10/1994 |
| JP | H08218894 A | 8/1996 |
| JP | H08510311 A | 10/1996 |
| JP | 2002201959 A | 7/2002 |
| JP | 2003074374 A | 3/2003 |
| JP | 2003106163 A | 4/2003 |
| JP | 2003184569 A | 7/2003 |
| JP | 2003293789 A | 10/2003 |
| JP | 2011231765 A | 11/2011 |
| JP | 2015183597 A | 10/2015 |
| JP | 2016003656 A | 1/2016 |
| JP | WO2016148008 A1 | 1/2018 |
| WO | 2007141101 A1 | 12/2007 |

OTHER PUBLICATIONS

PCT International Search Report and Written Opinion of International Searching Authority dated Sep. 27, 2019 corresponding to PCT International Application No. PCT/EP2019/061483 filed May 6, 2019.

* cited by examiner

EXTENDED GAS TURBINE PROCESS HAVING AN EXPANDER

CROSS REFERENCE TO RELATED APPLICATIONS

This application is the US National Stage of International Application No. PCT/EP2019/061483 filed 6 May 2019, and claims the benefit thereof. The International Application claims the benefit of German Application No. DE 10 2018 207 961.7 filed 22 May 2018. All of the applications are incorporated by reference herein in their entirety.

FIELD OF INVENTION

The invention relates to a power plant and to a method for operating such a power plant.

BACKGROUND OF INVENTION

Owing to changing market requirements in many countries, it appears that maximizing plant efficiencies will in future not exclusively promise success. Considering the requirements for the German or European market, it can be assumed that, owing to the increased expansion of renewable energy production, conventional power plants will have considerably fewer operating hours, and an enormous cost pressure is accordingly to be expected when building new power plants.

A reduction in plant complexity, with an associated reduction in costs, and, in addition, an improved quick-start capability specifically from the cold state appear to be an entirely promising approach in this context, even though they result in a deterioration in the plant efficiency.

As yet there are still no truly convincing answers to the above-mentioned problem. Although gas engine power plants provide an alternative, which in particular ensures quick-start capability, the investment costs for such a plant are comparatively high compared with combined cycle (GuD [gas and steam]) power plants, which have hitherto often been preferred, and, in addition, their efficiency is significantly lower.

A reduction in the plant complexity can be achieved in the case of GuD plants by omitting the uD part, that is to say the steam turbine part, of the power plant. However, a simple gas turbine process without a steam circuit leads to a drastic and economically non-viable deterioration of the process.

U.S. Pat. No. 2,172,708 therefore discloses a process in which air is compressed and the compressed air is further heated before it is first expanded and then fed to a combustion, wherein the further heating of the air takes place in heat exchange with exhaust gases which follow directly from the combustion.

WO 2007/141101 A1 discloses a further possibility for utilizing the heat of the exhaust gas from a first combustion, in which this exhaust gas, after expansion in a first turbine, is fed to a second combustion chamber.

A recuperated Joule process with intercooled compression results in a moderate drop in efficiency compared to the GuD reference process when the process is configured optimally. The complexity is drastically reduced, so that a significant cost reduction appears possible. It is expected that the economy of this concept will contrast very favorably with the current GuD concepts, and also with gas engine power plants, in the case of future market requirements. Another reason for this improved economy is that the extended gas turbine process has a similar start time to the simple gas turbine process and accordingly is significantly quicker than a GuD process. In addition, if the process is appropriately designed, it is not important for the start time or for the component lifetime whether the start has been preceded by a prolonged downtime with corresponding cooling of the plant components. Specifically after prolonged downtimes (cold-start conditions), the extended gas turbine process advantageously displays its particularly good quick-start capability compared to the GuD process. Furthermore, it is expected that improvements in terms of efficiency and load-change speeds will be achieved in respect of the part-load behavior.

SUMMARY OF INVENTION

The object of the invention is to further improve power plants having the described extended gas turbine process. A further object of the invention is to provide a correspondingly improved method for operating such a power plant.

The invention achieves the object directed at a power plant by providing that, in such a power plant having a compressor, a combustion chamber and a turbine, the power plant further comprising a compressor air line which connects the compressor to the combustion chamber, and a first heat exchanger which is connected into the compressor air line and into an exhaust line which branches from the turbine, a first expander is arranged in the compressor air line between the first heat exchanger and the combustion chamber, and that the first expander and the compressor are arranged on a common shaft. "Arranged on a common shaft" can also mean that the expander and the compressor can be coupled at least via a common transmission.

It is of fundamental importance for the extended gas turbine process that the incorporation of the recuperated heat is limited by the maximum permissible air temperature before entry into the combustion chamber section. This leads to a deterioration of the process efficiency. The proposed extended gas turbine process having an expander addresses precisely this issue. In order to achieve maximum recuperation at full firing temperature and thus gas turbine power, the outlet pressure, with a freely designed upstream compressor, is chosen to be higher than the required turbine inlet pressure (determined by the product series). The pressure gradient available as a result is used for an additional expansion on the air side prior to the combustion. It is thereby possible to preheat the compressed air in the recuperator to the maximum permissible outlet temperature by means of the exhaust gas stream and then feed it to the first expander. As a result of the expansion to the turbine pressure level, the temperature is lowered to the maximum permissible value of the combustion chamber section, with a simultaneous, additional power output. A drive shaft, which is still present, of the compressor can be used for coupling with the first expander.

In an advantageous embodiment, the compressor is a multi-stage intercooled compressor, in which second heat exchangers are arranged as compressor intercooling between compressor stages. The work expended for compression can thereby be reduced.

As a result of these changes compared to the extended gas turbine process, the following advantages are obtained: 1.) maximum recuperation combined with maximum process efficiency (+1.5 percentage points compared to the extended gas turbine process) and a maximum power of 4-7% compared to the extended gas turbine process, 2.) flexible adaptation to existing gas turbine product series, and 3.)

simple integration of the first expander by mechanical connection to a geared compressor with optimum speed.

These improvements are accompanied by only moderate expected additional costs for the hot air turbine and the connecting pipelines. The operating flexibility should not be impaired.

It is further advantageous if the first heat exchanger comprises two heat exchanger modules, which are both arranged one behind the other in each case in the compressor air line and the exhaust line, wherein a water injection is arranged in the compressor air line between the heat exchanger modules. This is advantageous for the amount of transmissible heat as well as for the subsequent combustion.

In an advantageous embodiment of the invention, the second heat exchangers, which are arranged between the compressor stages, are connected into a district heating circuit. In this manner, intercooling of the compressed air can take place and at the same time water for a district heating circuit can be heated again.

It is advantageous if a third heat exchanger is arranged in the exhaust line between the heat exchanger modules, for preheating fuel. When the fuel is preheated, the sensible heat of the fuel is increased and accordingly the required amount of fuel is reduced.

It is further advantageous if a fourth heat exchanger is arranged in an air supply line to the compressor and is connected into a cooling circuit of the power plant. By arranging the fourth heat exchanger in the air supply line, the air can be brought to a comparatively high temperature level even before it is compressed, which is advantageous for the subsequent heat utilization.

In an alternative embodiment of the invention to the power plant with heat incorporation into the district heating network, the power plant further comprises a thermally driven chiller which is connected on its heat input side, via a steam generator, to the exhaust line and to a return line of the compressor intercooling and on its cold output side to an inlet of at least part of the compressor intercooling. This variant has the major advantage of improved intercooling of the compressed air.

It is thereby advantageous if the chiller comprises at least one steam jet nozzle. Owing to the absence of moving parts and of a drive, such steam jet chillers are particularly simple and robust and are usually also less expensive than other chilling systems.

It is particularly advantageous if the chiller comprises two steam jet nozzles, the mixed stream outlets of which are brought together, and which are connected to one another in such a manner that flash evaporators are arranged upstream of the respective suction connections of the steam jet nozzles, and a water outlet of one flash evaporator is connected to a water inlet of the other flash evaporator. In this manner it is possible to achieve particularly good cooling of the water used, and accordingly also correspondingly good cooling of the compressed air.

In an advantageous embodiment of the power plant, an eighth heat exchanger is connected into the exhaust line downstream of the heat exchanger modules of the first heat exchanger in the direction of flow of an exhaust gas and is connected on the input side into the return line of the compressor intercooling and on the output side into one of the flash evaporators 29. The residual heat of the exhaust gas can thereby be used for a thermally driven chiller.

In a further advantageous power plant, an eighth heat exchanger is connected into the exhaust line between the heat exchanger modules of the first heat exchanger and is connected on the input side into the return line of the compressor intercooling and into a return line of the flash evaporator, into which it is also connected on the output side. With such an arrangement of the eighth heat exchanger, a higher steam pressure level is possible than with a downstream arrangement in the exhaust line, which results in increased efficiency of the steam jet chiller (thermally operated chiller). In addition, a better part-load behavior of the compressed air outlet temperature from the high-temperature recuperation is obtained by an interconnected external heat transfer.

Finally, it is advantageous if a further, second expander is arranged downstream of the first expander and is connected on the input side to the compressor air line at a position downstream of the first expander and opens on the output side into the exhaust line. This results in an improved efficiency of the power plant. In particular, a maximum efficiency potential for a "dry" process, that is to say without a water-steam circuit, can accordingly be exploited. The turbine of the second expander can be designed for temperatures at the air inlet below 480° C., since the connection is designed as a series connection, that is to say the second expander is connected not in parallel but in series downstream of the first expander. Finally, a cost-effective design is obtained through the connection of the second expander via a transmission to the air compressor (as in the case of the first expander).

The object directed to a method is achieved by a method for operating a power plant having a compressor, a combustion chamber and a turbine, in which an outlet pressure of the compressor is chosen to be higher than a required turbine inlet pressure, and in which the compressor air is expanded prior to the combustion and thereby utilized for driving the compressor, unlike in so-called compressed air energy storage systems, in which air is also compressed and expanded again, but the two operations are temporally uncoupled and corresponding compressed air stores are connected therebetween. In the present invention, the compressed air is not intermediately stored for later utilization but is used immediately after compression in a gas turbine process.

It is advantageous if the compressor air is preheated in a heat exchange with an exhaust gas of the power plant to a maximum permissible outlet temperature in terms of materials technology, before it is expanded, so that the expander outlet air does not become too hot for the combustion chamber inlet.

It is further advantageous if the compressor air is lowered by expansion to a turbine pressure level and a maximum permissible temperature for the combustion chamber. Accordingly, the excess energy in the compressed air is utilized while at the same time the air parameters for the combustion are set optimally.

It is further advantageous if waste heat from the exhaust gas and from the compressor intercooling is utilized for driving a chiller that utilizes heat, for the purpose of improved intercooling of the compressor.

In particular, it is advantageous if water is heated in heat exchange with exhaust gas and compressed air and is then evaporated at least partially, and water is further cooled in that there is connected to at least one flash evaporator, in which heated water is evaporated, at least one steam jet nozzle for withdrawing the steam by suction, wherein the water cooled during the evaporation is fed to at least part of a compressor intercooling.

BRIEF DESCRIPTION OF THE DRAWINGS

The invention will be explained in greater detail by way of example with reference to the drawings, in which, schematically and not to scale.

DETAILED DESCRIPTION OF INVENTION

Figure 1:
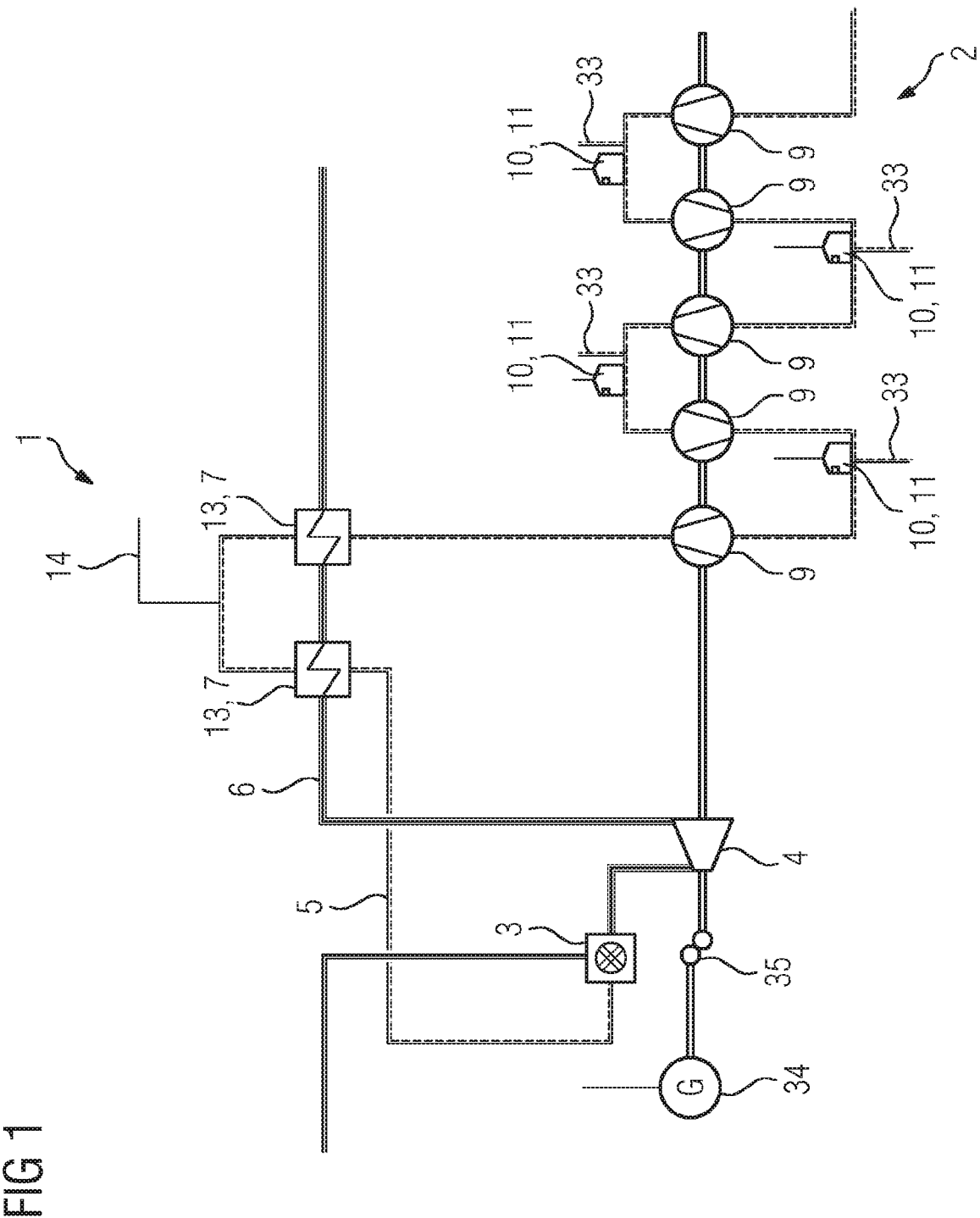
FIG. 1 shows an extended gas turbine process according to the prior art.

FIG. 1 shows, schematically and by way of example, an extended gas turbine process according to the prior art. The power plant 1 comprises a compressor 2, a combustion chamber 3 and a turbine 4. A compressor air line 5 connects the compressor 2 to the combustion chamber 3. A first heat exchanger 7 is connected into the compressor air line 5 and into an exhaust line 6 which branches from the turbine 4. In FIG. 1, the first heat exchanger 7 comprises two heat exchanger modules 13, which are both arranged one behind the other in each case in the compressor air line 5 and the exhaust line 6, wherein a water injection 14 is arranged in the compressor air line 5 between the heat exchanger modules 13.

The compressor 2 is a multi-stage intercooled compressor 2, in which second heat exchangers 10 are arranged as compressor intercooling 11 between the compressor stages 9.

The compressor 2 further has taps 33 between the compressor stages 9, for cooling of the combustion chamber 3 and/or the turbine 4.

Finally, the power plant 1 of FIG. 1 comprises a generator 34, which is connected to the turbine 4 via a transmission 35.

Figure 2:
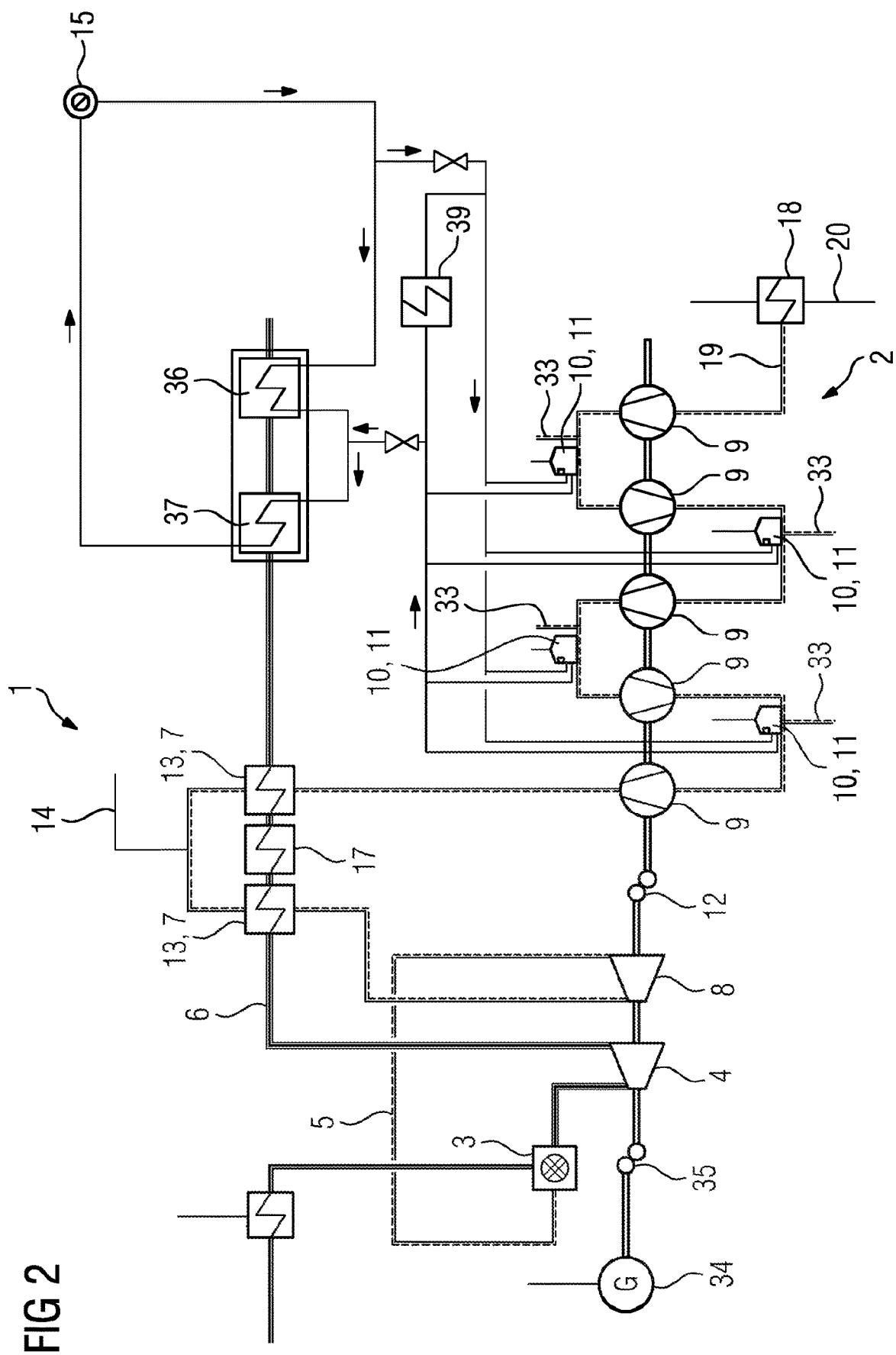
FIG. 2 shows an extended gas turbine process having a first expander according to the invention.

FIG. 2 shows an extended gas turbine process having a first expander 8 according to the invention. The first expander 8 is arranged in the compressor air line 5 between the first heat exchanger 7 and the combustion chamber 3 and can be coupled with the compressor 2 via a common transmission 12.

For better utilization of the heat generated on compression, the second heat exchangers 10 are connected into a district heating circuit 15. The provision of heat for the district heating circuit 15 takes place as follows. The cold return water stream from the district heating circuit 15 is divided. A first partial stream is fed to the second heat exchangers 10 for the intercooling 11 of the compressor 2, and a second partial stream is fed to a fifth heat exchanger 36, which is arranged in the exhaust line 6. After heating, the two partial streams are combined and fed to a sixth heat exchanger 37, which is likewise arranged in the exhaust line 6 upstream of the fifth heat exchanger 36 in the direction of flow of the exhaust gas. The stream of water, which is further heated there, is fed to the district heating circuit 15 again.

If no district heating is required, the heat generated on compression is discharged to the environment, for example via Fin-Fan cooling or a cooling tower. For this purpose, a bypass line having a seventh heat exchanger 39 is provided in the power plant 1 of FIG. 2.

FIG. 2 further shows a third heat exchanger 17 for preheating fuel, which third heat exchanger is arranged in the exhaust line 6 between the heat exchanger modules 13.

Finally, a fourth heat exchanger 18 is also arranged in an air supply line 19 to the compressor 2 and connected into a cooling circuit 20 of the power plant 1.

Figure 3:
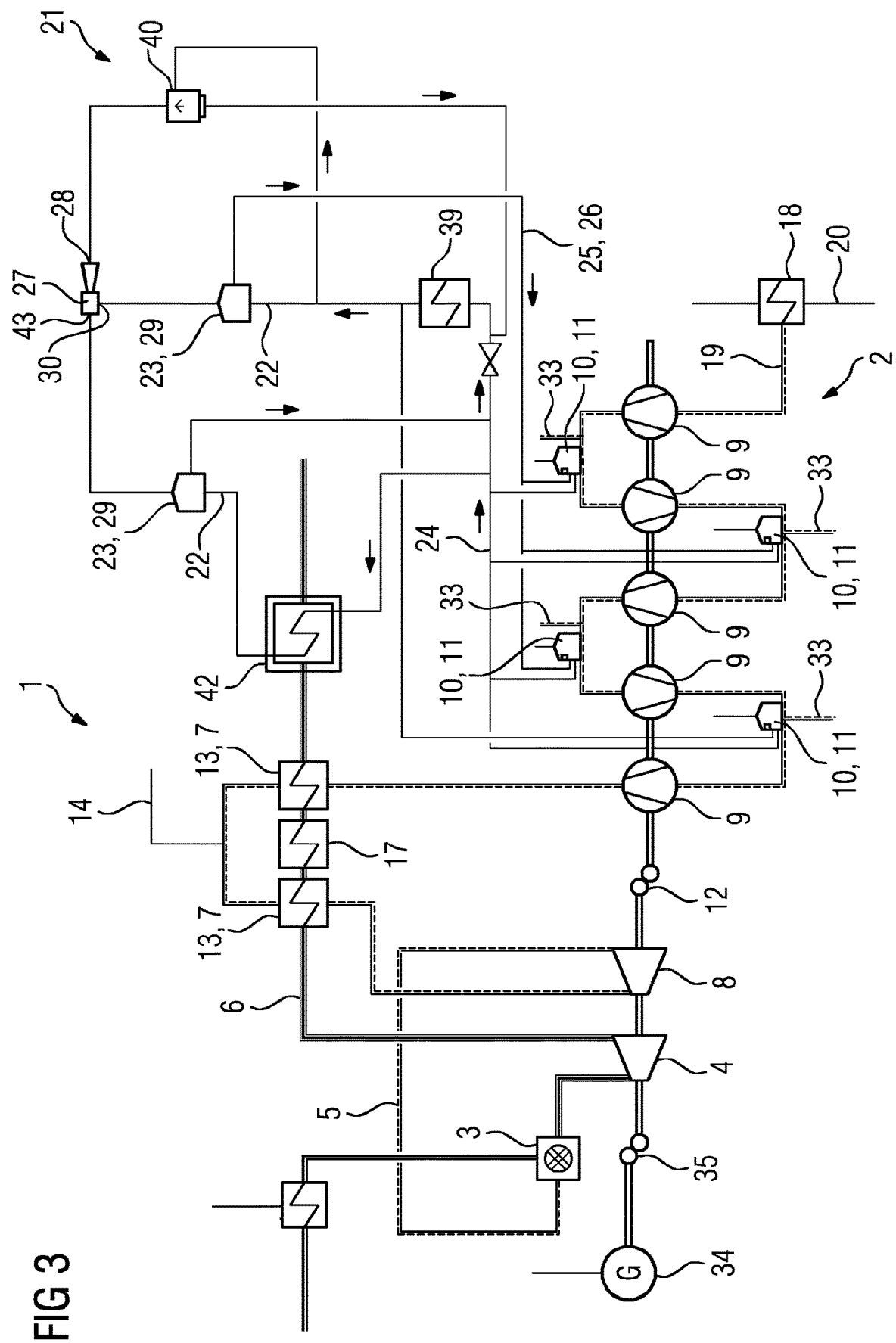
FIG. 3 shows an extended gas turbine process having single-stage low-pressure steam, a steam jet nozzle and an injection condenser.

The embodiment of FIG. 3 comprises a thermally driven chiller 21, which is connected on its input side 22 via an eighth heat exchanger 42 to the exhaust line 6 and to a return line 24 of the compressor intercooling 11.

A stream of water from the return line 24 of the compressor intercooling 11 is divided. A first partial stream passes through the heat exchanger 42 and takes up heat from the exhaust line 6. After heating, it is fed to a flash evaporator 29, wherein the steam that is produced is fed to the motive agent connection 43 of a steam jet nozzle 27, while water that remains is fed to a second partial stream of the water from the return line 24 of the compressor intercooling 11. This re-combined stream, after being cooled in the seventh heat exchanger 39, is divided again, wherein a first partial stream cools the air fed to the last compressor stage 9 and a second partial stream is fed to a flash evaporator 29. Steam that is produced is fed to a suction connection 30 of the steam jet nozzle 27, water that remains is fed to the inlet of the compressor intercooling 11, which supplies cooling water to all the other compressor stages 9 apart from the last compressor stage 9.

The steam leaving the mixed stream outlet of the steam jet nozzle 27 is fed to an injection condenser 40 with injection cooling. The condensate that forms is mixed upstream of the seventh heat exchanger 39 with the stream of water coming from the compressor cooling 11. The water required for the injection condenser 40 is removed from the line downstream of the seventh heat exchanger 39.

Figure 4:
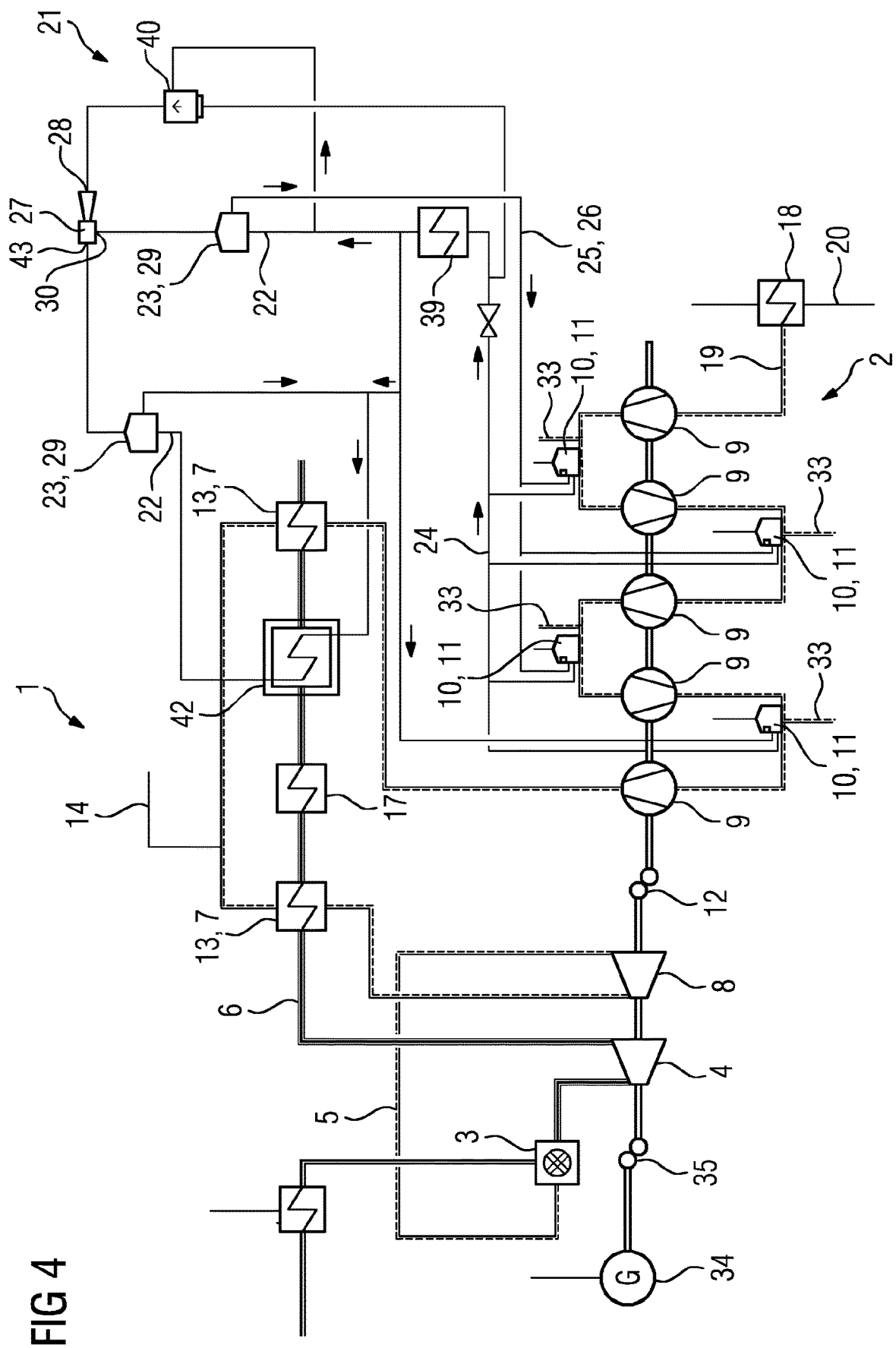
FIG. 4 shows an extended gas turbine process having a heat exchanger for a thermally driven chiller which is in a changed position compared to the exemplary embodiment of FIG. 3.

FIG. 4 shows an exemplary embodiment in which the heat exchanger 42, as compared with the exemplary embodiment of FIG. 3, is moved upwards, in terms of its arrangement in the exhaust line 6, between the heat exchanger modules 13. As a result of the higher exhaust gas temperature at that point in comparison with the embodiment of FIG. 3, a higher steam pressure level, and thus an increased efficiency of the thermally operated steam jet chiller, is possible. Furthermore, there is obtained a better part-load control behavior of the compressed air outlet temperature from the high-temperature recuperation by the intermediately connected external heat transfer.

The cooling process does not necessarily have to be carried out with the steam jet. Absorption or adsorption processes are likewise possible.

Figure 5:
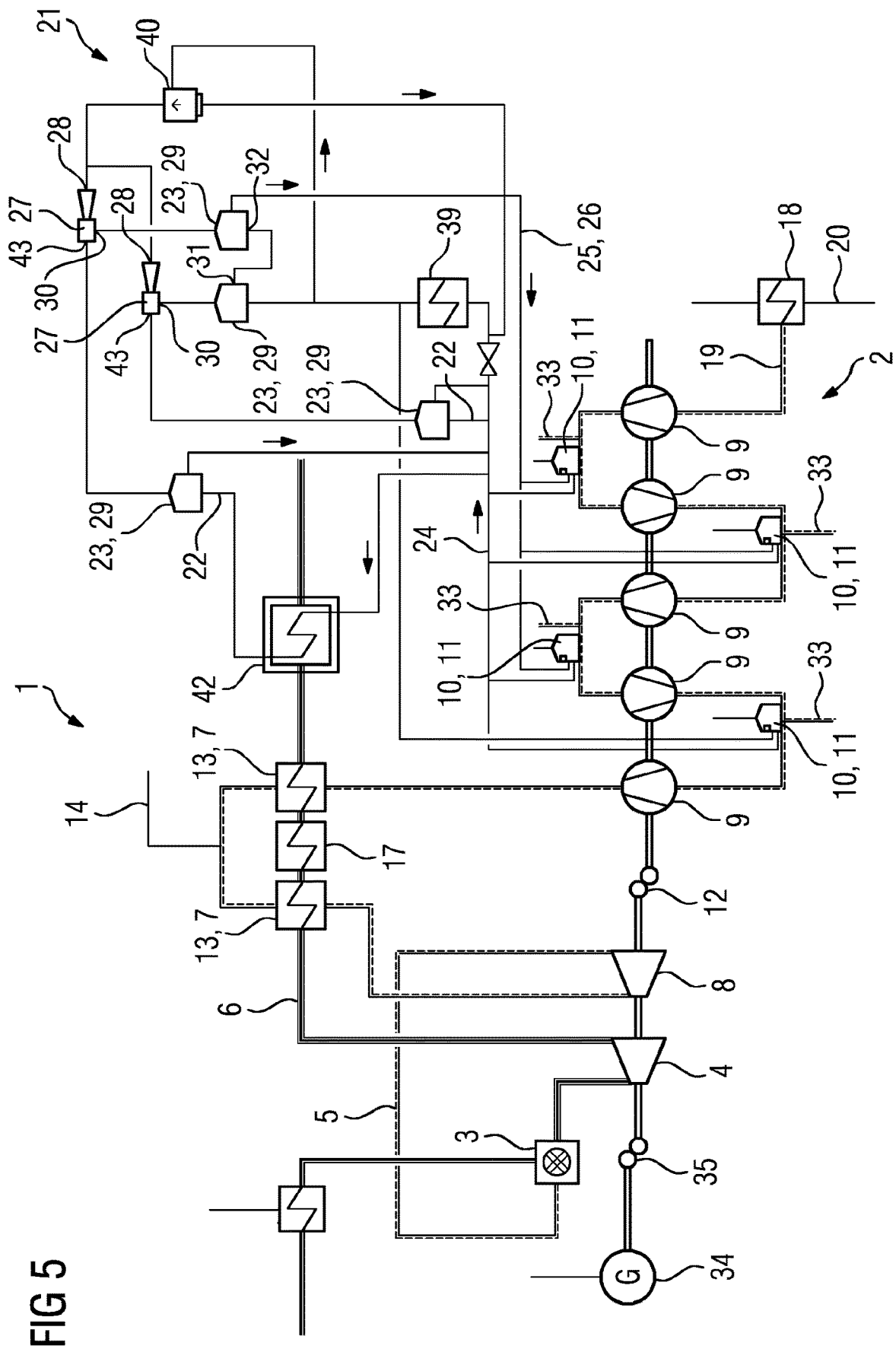
FIG. 5 shows an extended gas turbine process having two-stage low-pressure steam and an injection condenser.

FIG. 5 shows an extended gas turbine process having two-stage low-pressure steam and an injection condenser. The chiller 21 thereby comprises two steam jet nozzles 27, the mixed stream outlets 28 of which are brought together, and which are connected together in such a manner that flash evaporators 29 are arranged upstream of the respective suction connections 30 of the steam jet nozzles 27, and a water outlet 31 of one flash evaporator 29 is connected to a water inlet 32 of the other flash evaporator 29. In this manner it is possible to achieve more pronounced cooling of the water for the compressor intercooling 11 than in the exemplary embodiment of FIG. 3.

Figure 6:
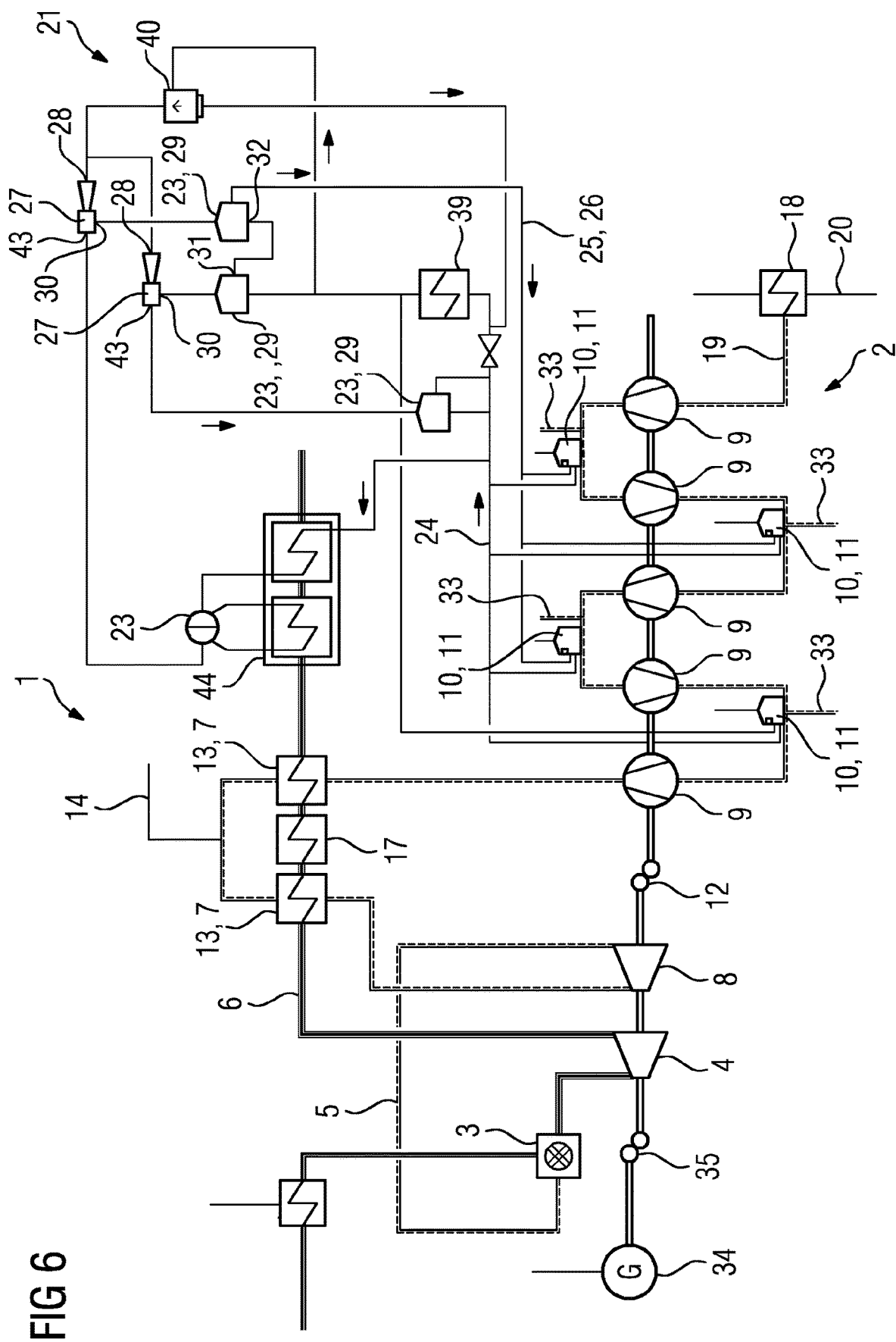
FIG. 6 shows an extended gas turbine process having two-stage low-pressure steam and a low-pressure evaporator.

FIG. 6 shows a further variant, in which steam, at least in part, is not produced in a flash evaporator 29, but in which a low-pressure evaporator 44 is arranged in the exhaust line 6.

Figure 7:
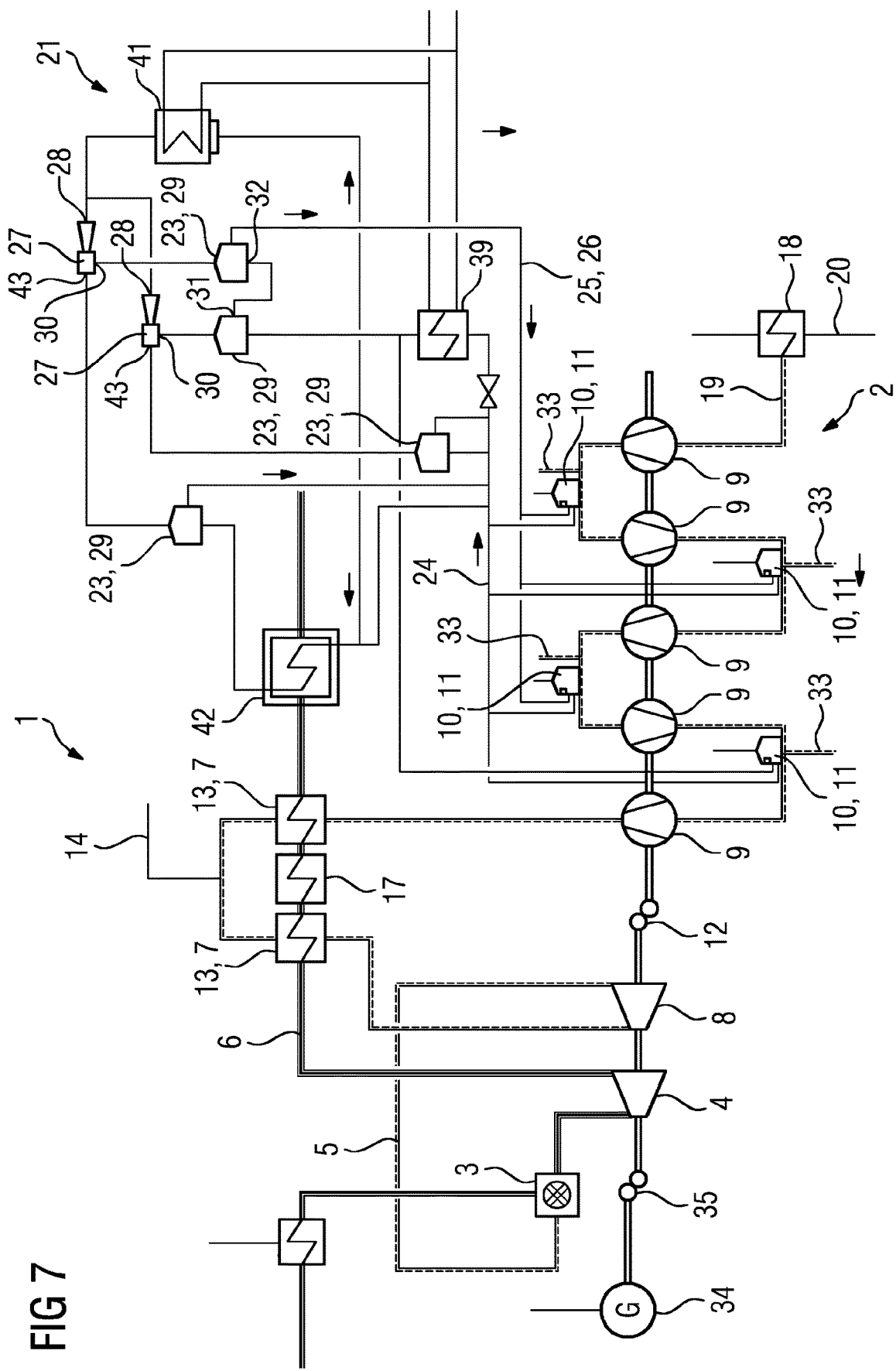
FIG. 7 shows an extended gas turbine process as in FIG. 4 having a surface condenser instead of an injection condenser.

Finally, FIG. 7 shows a surface condenser 41 as an alternative to the injection condenser 40 of FIG. 4. The surface condenser 41 would then, like the seventh heat exchanger 39, have to be supplied by external cooling.

Figure 8:
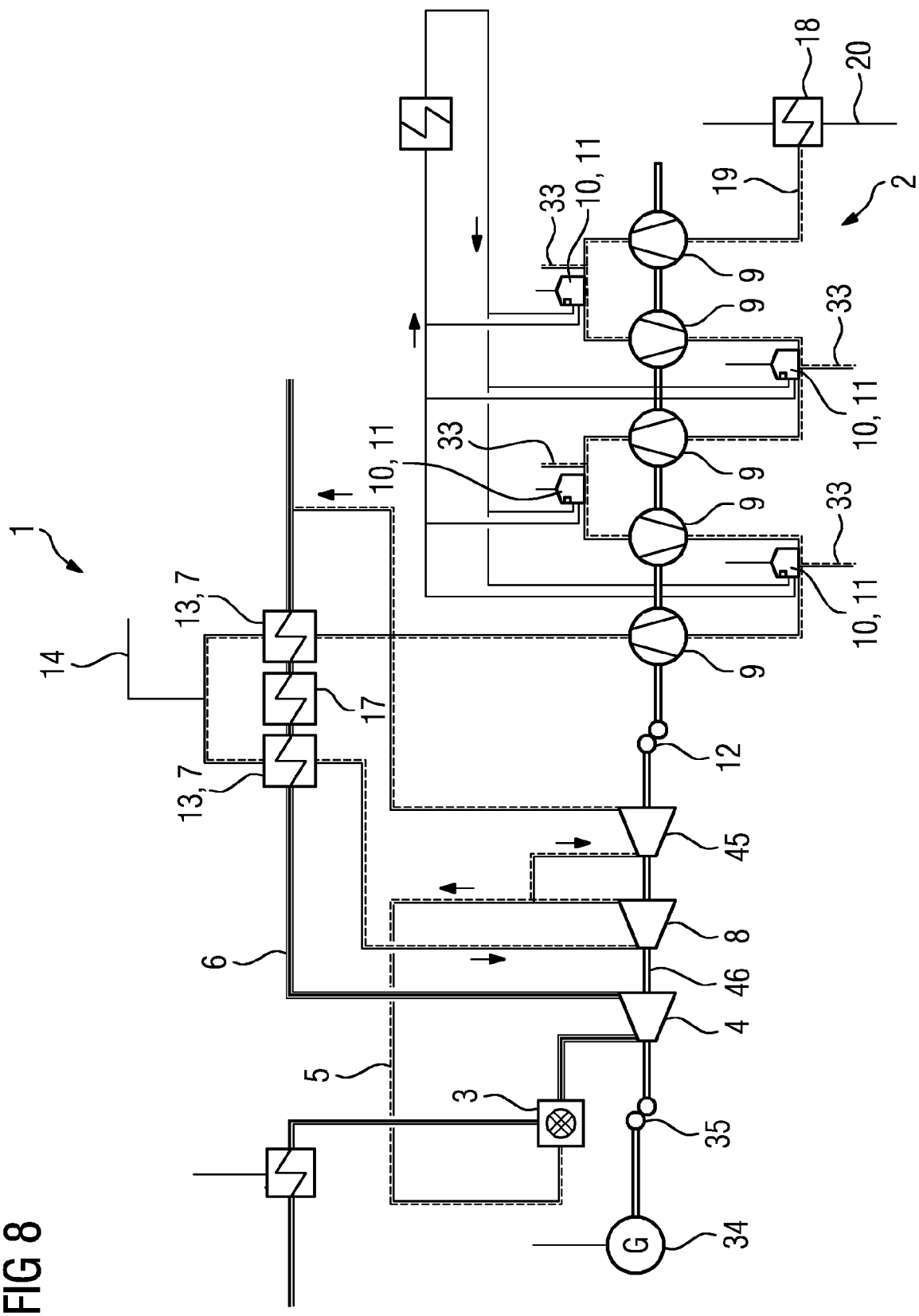
FIG. 8 shows an extended gas turbine process having a second expander.

Finally, FIG. 8 shows an embodiment of the invention having a second expander, which is arranged on the same shaft 46 as the first expander 8 and is connected on the input side to the compressor air line 5 at a position downstream of the first expander 8 and opens on the output side into the exhaust line 6. The arrangement on one shaft 46 is not absolutely necessary. The second expander can also be seated on its own shaft, which is incorporated into the transmission.

The connection of the expanders 8, 45 is designed as a series connection, that is to say the second expander 45 is connected not in parallel but in series downstream of the first expander 8.

In addition, the second expander, like the first expander 8, is connected to the compressor 2 via a transmission.

The invention claimed is:

1. A method for operating a power plant having a compressor, a combustion chamber and a turbine, the method comprising:
   choosing an outlet pressure of the compressor to be higher than a required turbine inlet pressure,
   preheating the compressor air in a heat exchanger before the compressor air is expanded prior to the combustion,
   wherein the compressor air is preheated in the heat exchanger with an exhaust gas of the power plant, and
   wherein the expansion of the compressor air prior to the combustion is utilized for driving the compressor.

2. The method as claimed in claim 1, wherein the compressor air is lowered by the expansion to a turbine pressure level and a maximum permissible temperature for the combustion chamber.

3. The method as claimed in claim 1, wherein waste heat from the exhaust gas and from a compressor intercooling is utilized for driving a chiller that utilizes the waste heat, for the purpose of improved intercooling of the compressor.

4. The method as claimed in claim 3,
   wherein water is heated in the heat exchange with the exhaust gas and compressed air and is then evaporated at least partially by a first flash evaporator,
   wherein the steam produced by the first flash evaporator is fed to a steam jet nozzle and the water produced is further cooled and fed to a second flash evaporator, in which the heated water is evaporated, the steam withdrawn by at least one steam jet nozzle for withdrawing the steam by suction,
   wherein the water cooled during the evaporation is fed to an inlet of at least part of the compressor intercooling.

* * * * *